(12) United States Patent
Genta

(10) Patent No.: US 8,840,183 B2
(45) Date of Patent: Sep. 23, 2014

(54) MOTOR VEHICLE REAR SEAT

(71) Applicant: Fiat Group Automobiles S.p.A., Turin (IT)

(72) Inventor: Marco Genta, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 0 days.

(21) Appl. No.: 13/778,992

(22) Filed: Feb. 27, 2013

(65) Prior Publication Data
US 2013/0241252 A1    Sep. 19, 2013

(30) Foreign Application Priority Data

Feb. 29, 2012    (EP) ..................................... 12425046

(51) Int. Cl.
*A47C 15/00* (2006.01)
*B60N 2/02* (2006.01)
*B60N 2/68* (2006.01)
*B60N 2/01* (2006.01)
*B60N 2/30* (2006.01)

(52) U.S. Cl.
CPC *B60N 2/01* (2013.01); *B60N 2/682* (2013.01); *B60N 2/3013* (2013.01)
USPC ............................ 297/248; 297/353; 297/383

(58) Field of Classification Search
USPC .................... 297/378.13, 248, 257, 383, 353; 296/63, 64, 65.01, 65.16; 248/503.1
See application file for complete search history.

(56) References Cited

U.S. PATENT DOCUMENTS

| 1,685,770 | A | * | 10/1928 | Bowen ........................... 297/326 |
| 5,685,612 | A | | 11/1997 | MacDonald et al. |
| 6,030,044 | A | * | 2/2000 | Kosugi et al. ............ 297/440.16 |
| 6,174,030 | B1 | * | 1/2001 | Matsuo ....................... 297/463.1 |
| 6,533,341 | B2 | * | 3/2003 | Marinelli .................... 296/65.16 |
| 7,083,215 | B2 | * | 8/2006 | Rhee et al. .................. 296/65.16 |
| 7,581,793 | B2 | * | 9/2009 | Hartmann et al. ......... 297/463.1 |
| 7,758,129 | B2 | * | 7/2010 | Maruno et al. ........... 297/440.15 |

FOREIGN PATENT DOCUMENTS

| CH | 532 726 A | 1/1973 |
| DE | 30 47 973 A1 | 10/1981 |
| EP | 1 241 046 A1 | 9/2002 |

* cited by examiner

*Primary Examiner* — Milton Nelson, Jr.
(74) *Attorney, Agent, or Firm* — Dickstein Shapiro LLP

(57) ABSTRACT

A motor vehicle rear seat has two units, which are set side by side along a horizontal axis, are each provided with a respective squab and a respective backrest and are arranged on opposite sides of a support device having a lower base designed to be fastened to a floorpan of the motor vehicle; the device has a body that supports the two units and has a position that can be adjusted in a longitudinal direction and in height with respect to the lower base; a fixing device is provided to block this body in the desired position with respect to the lower base.

13 Claims, 2 Drawing Sheets

MOTOR VEHICLE REAR SEAT

The present invention relates to a motor vehicle rear seat.

BACKGROUND OF THE INVENTION

As is known, motor vehicle rear seats are generally of the split type, i.e. they consist of two units side by side, each having an associated squab and an associated backrest. The backrests are hinged to the corresponding squabs such that they can turn between a raised position, of normal use, and a lowered position, where the backrests are folded forwards so as to increase the space of the boot provided behind the rear backrest.

These units are arranged on opposite lateral parts of a bracket, which supports both units and has a base fixed to the floorpan of the motor vehicle.

The dimensions and shape of this bracket are designed according to the space available inside the motor vehicle, the shape of the floorpan, the height position and the longitudinal position of the backrests, etc. In consequence, the characteristics of the above-mentioned bracket vary substantially between different motor vehicles.

The need is felt to standardize, at least in part, the design and construction of the bracket that supports the two units, in order to uniform the production of the bracket for a large range of motor vehicles and/or for a large range of rear seats.

SUMMARY OF THE INVENTION

The object of the present invention is that of making a motor vehicle rear seat that enables the above-described need to be satisfied in a simple and economic manner and which is equipped with a relatively robust and relatively easy to install support bracket.

According to the present invention, a motor vehicle rear seat is made as defined in claim 1.

BRIEF DESCRIPTION OF THE DRAWINGS

For a better understanding of the present invention, a preferred embodiment will now be described, purely by way of non-limitative example, with reference to the attached drawings, where.

DETAILED DESCRIPTION OF THE INVENTION

Figure 1:
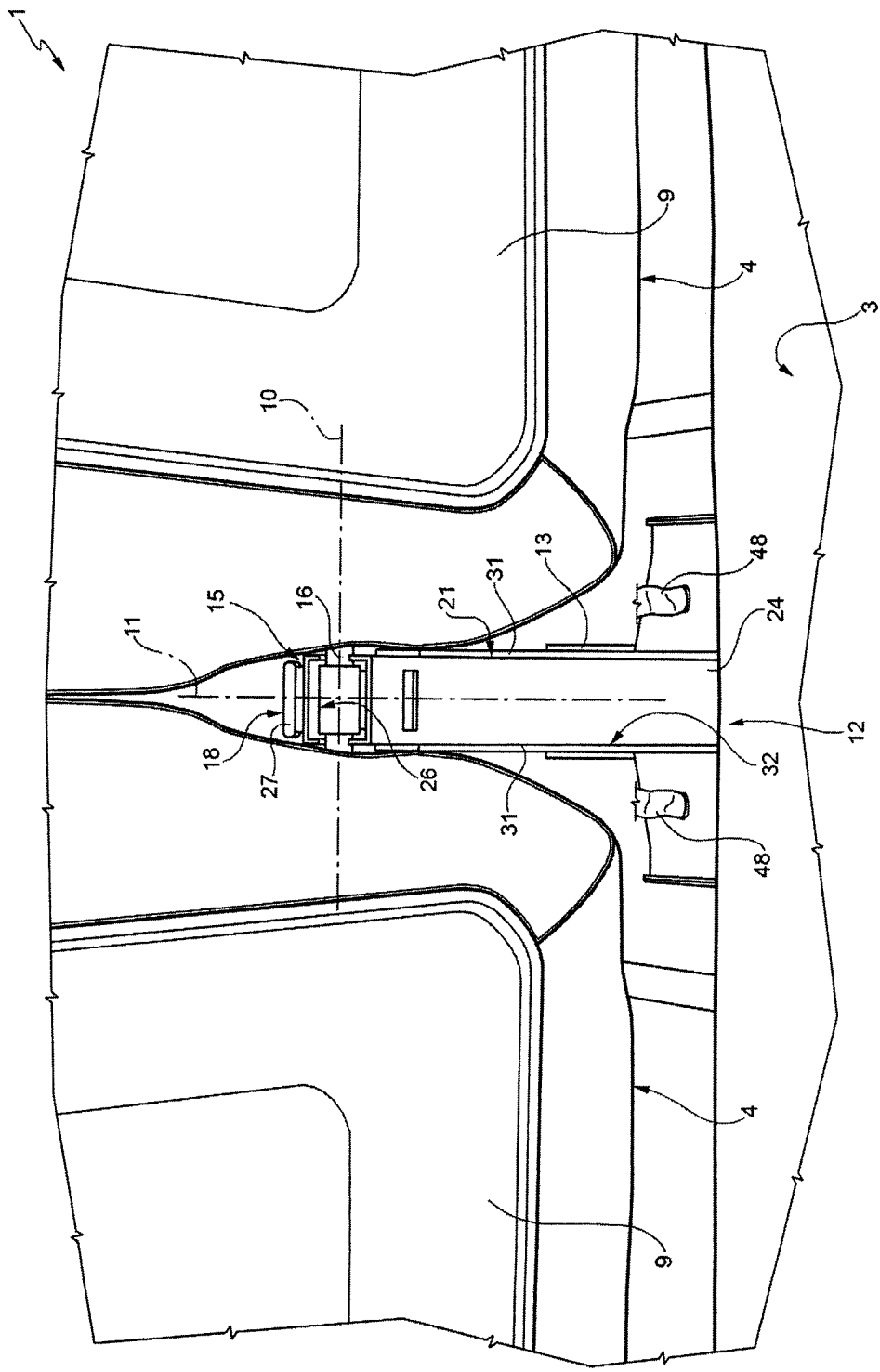
FIG. 1 is a rear perspective view, with parts removed for clarity, of a preferred embodiment of the motor vehicle rear seat according to the present invention.

In FIG. 1, reference numeral 1 indicates, as a whole, a rear seat (partially, shown) mounted as the last row of seats in a motor vehicle passenger compartment, i.e. in front of a rear boot 3 (partially shown). The seat 1 is of the split type, it comprises two units 4, which are arranged side by side and comprise, each, a respective squab (not shown) and a respective backrest 9.

The backrests 9 can be folded down independently of each other from a raised position to a lowered position about respective horizontal axes 10, aligned with each other and orthogonal to the longitudinal direction 11 of travel of the motor vehicle. In the raised position, each backrest 9 defines a support for the back of a user. In the lowered position, each backrest 9 is reclined forwards, to a substantially horizontal position, so as to put the boot 3 into communication with the passenger compartment and increase the space of the boot 3.

The seat 1 comprises a support device 12, which comprises a lower base 13 fixed to a floorpan 14 of the motor vehicle and an upper portion 15 arranged between the inner sides of the two units 4. In particular, portion 15 is shaped to support a pin 16, which is parallel to the axes 10 and joins the two units 4.

Preferably, the pin 16 constitutes part of a hinge device that connects the backrest 9 to the corresponding squab in each unit 4. In particular, portion 15 defines a seat 17 (FIG. 2), which is through along an axis parallel to axes 10, is engaged by pin 16 and is closed at the top by a plate 18, forming part of the device 12 and fixed to portion 15.

Figure 2:
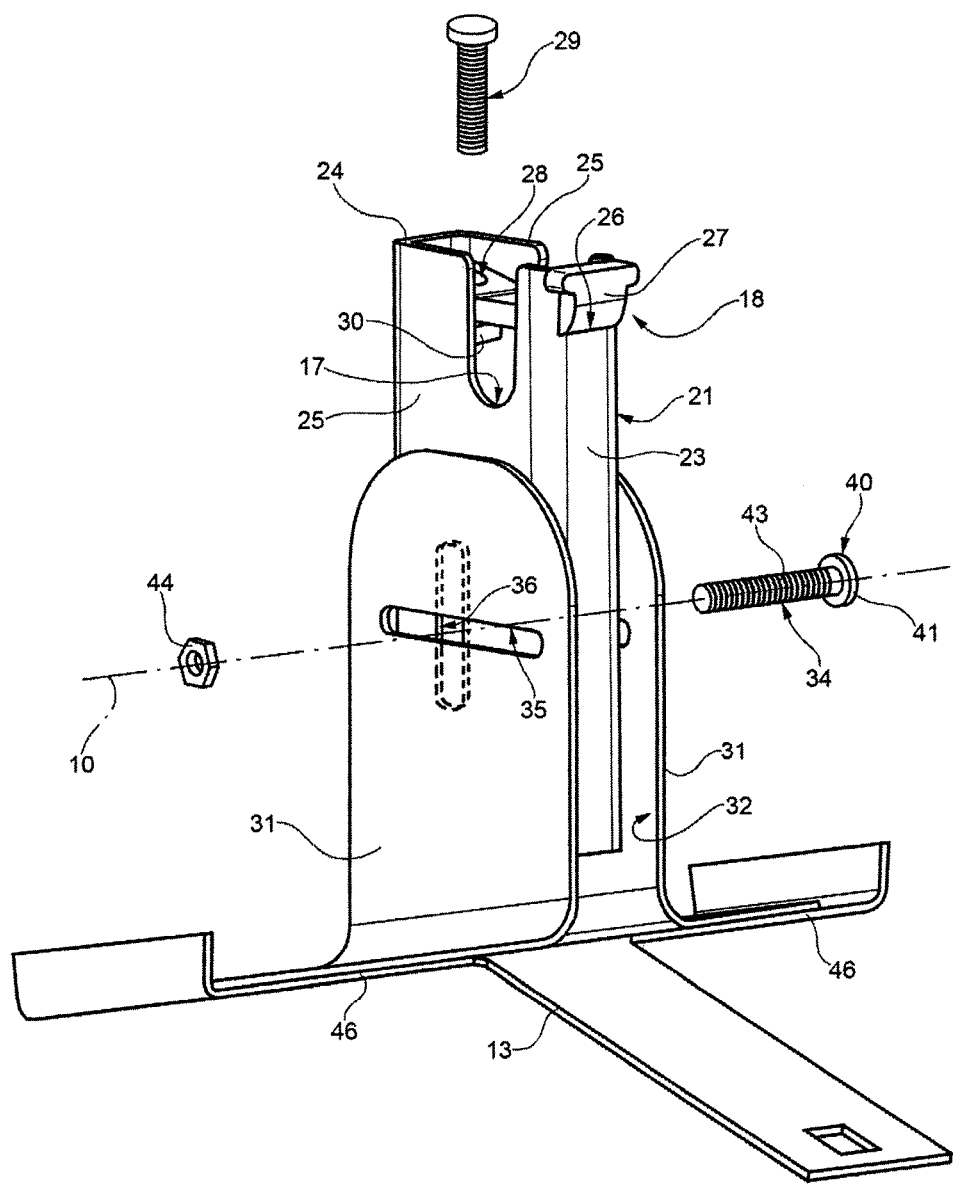
FIG. 2 shows a component of the rear seat in FIG. 1 on an enlarged scale and from a different perspective.

With reference to FIG. 2, portion 15 is defined by the upper end of a body 21, which has a substantially parallelepiped shape and is internally hollow, as it comprises a front wall 23 and a rear wall 24, spaced apart from each other in direction 11, and two lateral walls 25, spaced apart from each other along the axis of the seat 17. In particular, wall 23 (or wall 24) has an opening 26, into which a curved end 27 of plate 18 hooks. At the opposite end, plate 18 has a substantially vertical hole 28, engaged by a bolt 29 that fastens the plate 18 to a folded tongue 30 of wall 24.

The body 21 is located between two vertical parallel plates 31, which are parallel to and face the walls 25 so as to delimit a seat 32 engaged by the body 21. The body 21 has a width substantially equal to that of the seat 32, and so the position of portion 15 can be adjusted by translating or rotating the body 21 in the seat 32 along a plane orthogonal to the axis of the seat 17 under the guide for the plates 31.

A releasable fixing device 34 is provided to fasten the body 21 to the plates 31. The device 34 engages two guide elements 35 and 36 that guide the movement of the body 21 in the seat 32 along respective directions that are mutually transversal and are orthogonal to the axis of the seat 17. In particular, guide element 35 is defined by a pair of parallel slots, made in the plates 31, while guide element 36 is defined by a pair of parallel slots, made in walls 25. In particular, slots 36 are substantially vertical, while slots 35 are parallel to direction 11. The device 34 is defined by a bolt comprising a screw 40, which is parallel to the axis of the seat 17 and has a head 41 resting against one of the two plates 31. The screw 40 has a threaded shank 43, engaging the slots 35 and 36 and having an end that projects beyond the other of the two plates 31. The bolt 34 comprises a nut 44, which can be tightened onto the end of the shank 43 to force the plates 31 towards each other and against the body 21, and so block the position of portion 15 by friction and in a releasable manner. Before tightening the nut 44, the shank 43 and the slots 35 and 36 define a hinge, which guides the rotation of the body 21 about the axis of the shank 43 with respect to the plates 31.

Preferably, the base 13 and the plates 31 are defined by parts that are separate from each other: in this way, during production, the device 12 can be made with bases having different shapes from each other, depending on the shape of the upper surface of the floorpan 14. Advantageously, the base 13 comprises two flanges 46 that project laterally with respect to the seat 32 and define respective connection zones or seats 47 that, underneath, are fastened to the floorpan 14 and, above, can be used to fasten the plates 31 and/or connection elements (partially shown in FIG. 1) of the motor vehicle's safety belts.

During assembly of the rear seat 1 on the floorpan 14, the position of portion 15 can be adjusted according to the effective position of the rear seat 1 in the passenger compartment, along direction 11, as well as in height and angle around the axis of the shank 43.

In consequence, it is evident how it is possible to adapt the device 12 to different motor vehicles and/or to different rear seats. In particular, the device 12 provides three degrees of freedom in positioning portion 15, thanks to the presence of the two translation guides defined by the slots 35 and 36 and to the rotational guide defined by the shank 43.

In this way, the device 12 is a "universal" support that can be adopted as a standard component for exceedingly different motor vehicles. The only possible requirement could be that of changing and/or redesigning the base 13.

Furthermore, the device 12 can compensate for possible imprecisions in the positioning of the lateral anchor points (not shown) of the rear seat 1, due, for example, to assembly errors and/or constructional errors. In particular, thanks to the adjustment of the device 12, it is possible to keep the two axes 10 aligned notwithstanding these imprecisions.

It is also evident from the foregoing that the device 12 is relatively simple to manufacture, as its components are made from sheet metal and are relatively low in number. The position of portion 15 is also relatively easy to lock and unlock, thanks to the presence of a simple bolt 34. At the same time, the structure of the plates 31 and the body 21 is relatively robust, and so the device 12 does not negatively affect the safety requirements of the rear seat 1.

Finally, from the foregoing, it is clear that changes and modifications can be made to the described and illustrated rear seat 1 without leaving the scope of protection of the present invention, as defined in the appended claims.

In particular, the way of coupling the two units 4 to the body 21 could be different from that shown by way of example, and/or the slots 35 and 36 could be replaced by equivalent guide elements and/or be oriented along different directions from those shown in FIG. 2, and/or the body 21 could have a different shape or size from those shown, and/or the plates 31 could be replaced by support members with a different shape and/or structure, and/or device 34 could be different from the shown bolt and/or comprise additional fixing elements, for example spot welds added after having completed the adjustment of the body 21.

The invention claimed is:

1. A motor vehicle rear seat, comprising:
   two units set side by side along a horizontal axis and comprising, each, a respective squab and a respective backrest;
   a support device comprising a lower base designed to be fixed to a floorpan of the motor vehicle and an upper connection portion arranged between said units and supporting said units;
   wherein said support device comprises:
      guide means arranged between said upper connection portion and said lower base to vary the position of said upper connection portion, wherein said guide means comprises at least one rectilinear guide element that is elongated along a guiding direction orthogonal to said horizontal axis and defines a linear guide along said guiding direction; and
      fixing means to block said upper connection portion in the desired position with respect to said lower base.

2. A rear seat according to claim 1, wherein said fixing means are of the releasable type.

3. A rear seat according to claim 2, wherein said releasable fixing means comprises a bolt comprising:
   a shank slidingly coupled to said guide means, and
   a nut designed to be tightened onto said shank so as to fasten said upper connection portion to support means, which are fixed with respect to said lower base.

4. A rear seat according to claim 3, wherein said shank is parallel to said horizontal axis, and wherein said upper connection portion is rotatable with respect to said lower base about the axis of said shank.

5. A rear seat according to claim 1, wherein said guide means further comprises a first and a second rectilinear guide element to guide said upper connection portion along directions which are mutually transversal and are orthogonal to said horizontal axis.

6. A rear seat according to claim 5, wherein said first and second rectilinear guide elements are defined by slots.

7. A rear seat according to claim 5, wherein said first rectilinear guide element is fixed with respect to said lower base and said second rectilinear guide element is fixed with respect to said upper connection portion.

8. A rear seat according to claim 1, further comprising two support members fixed with respect to said lower base and defining a seat between them; said upper connection portion defining part of a body that is arranged in said seat and guided by said support members such that it can slide along a plane orthogonal to said horizontal axis.

9. A rear seat according to claim 8, wherein said support members and said lower base are defined by parts that are separate from each other.

10. A rear seat according to claim 8, wherein said support members are defined by respective vertical parallel plates.

11. A motor vehicle rear seat, comprising:
   two units set side by side along a horizontal axis and comprising, each, a respective squab and a respective backrest;
   a support device comprising a lower base designed to be fixed to a floorpan of the motor vehicle and an upper connection portion arranged between said units and supporting said units;
   wherein said support device comprises:
      guide means arranged between said upper connection portion and said lower base to vary the position of said upper connection portion, wherein said guide means comprises at least one rectilinear guide element that is elongated along a guiding direction orthogonal to said horizontal axis and defines a linear guide along said guiding direction; and
      fixing means to block said upper connection portion in the desired position with respect to said lower base;
   two support members fixed with respect to said lower base and defining a seat between them; and
   said upper connection portion defining part of a body that is arranged in said seat and guided by said support members such that it can slide along a plane orthogonal to said horizontal axis.

12. A motor vehicle rear seat, comprising:
   two units set side by side along a horizontal axis and comprising, each, a respective squab and a respective backrest;
   a support device comprising a lower base designed to be fixed to a floorpan of the motor vehicle and an upper connection portion arranged between said units and supporting said units;
   wherein said support device comprises:
      guide means arranged between said upper connection portion and said lower base to vary the position of said upper connection portion, wherein said guide means comprises at least one rectilinear guide element that is elongated along a guiding direction orthogonal to said horizontal axis and defines a linear guide along said guiding direction, and wherein the at least one rectilinear guide element comprises a first and a second rectilinear guide element to guide said upper connection portion along directions which are mutually transversal and are orthogonal to said horizontal axis; and fixing means to block said upper connection portion in the desired position with respect to said lower base.

13. A motor vehicle rear seat, comprising:

two units set side by side along a horizontal axis and comprising, each, a respective squab and a respective backrest;

a support device comprising a lower base designed to be fixed to a floorpan of the motor vehicle and an upper connection portion arranged between said units and supporting said units;

wherein said support device comprises:

guide means arranged between said upper connection portion and said lower base to vary the position of said upper connection portion, wherein said guide means comprises at least one rectilinear guide element that is elongated along a guiding direction orthogonal to said horizontal axis and defines a linear guide along said guiding direction; and fixing means to block said upper connection portion in the desired position with respect to said lower base, wherein said fixing means are of the releasable type, the releasable fixing means comprising a bolt comprising:

a shank slidingly coupled to said guide means, and a nut designed to be tightened onto said shank so as to fasten said upper connection portion to support means, which are fixed with respect to said lower base.

* * * * *